United States Patent [19]
Opitz, Sr.

[11] 3,866,860
[45] Feb. 18, 1975

[54] AIRPLANE WHEEL ROTATOR

[76] Inventor: John M. Opitz, Sr., 2641 Aqueduct Rd., Schenectady, N.Y. 12309

[22] Filed: Sept. 24, 1973

[21] Appl. No.: 400,068

[52] U.S. Cl. .......................................... 244/103 S
[51] Int. Cl. ........................................... B64c 25/40
[58] Field of Search ..................... 244/103 S, 103 R

[56] References Cited
UNITED STATES PATENTS

| | | | |
|---|---|---|---|
| 1,834,427 | 12/1931 | Schumacher | 244/103 S |
| 2,389,525 | 11/1945 | Manheim | 244/103 S |
| 2,424,941 | 7/1947 | Musser et al. | 244/103 S |

FOREIGN PATENTS OR APPLICATIONS

| | | | |
|---|---|---|---|
| 912,891 | 8/1946 | France | 244/103 S |

*Primary Examiner*—George E. A. Halvosa
*Assistant Examiner*—Barry L. Kelmachter

[57] ABSTRACT

A device for rotating the wheels of aircraft when they are moved to the aircraft landing position consisting of providing air stream deflecting fairing over the major portions of the wheels, and exposing portions of the wheels to the air stream to exert forces on the wheels to rotate them in the direction in which the aircraft is travelling.

5 Claims, 3 Drawing Figures

AIRPLANE WHEEL ROTATOR

BACKGROUND OF THE INVENTION

In the operation of aircraft, particularly the larger and faster craft it is customary to retract or elevate the landing wheels into the fuselage or wings of the aircraft to eliminate the resistance caused by the wheels and landing gear as the aircraft passes through the air. When the aircraft approaches its destination the wheels are moved to the landing position and, they are standing still, that is not rotating at the instant of contact of the aircraft with the ground. When contact with the ground is made the wheels are subjected to violent forces resulting from the forward speed of the aircraft and its downward movement toward the ground. The wheels are violently accelerated from zero speed to the forward speed of the aircraft. This subjects the tires to very extreme forces and as a result the tires "smoke" and leave long streaks of rubber on the runways. This "laying of rubber" quickly wears out the tires. Due to the necessity to minimize the weight of aircraft components, aircraft tires are made as light as possible, with virtually no tread on their runway contacting surfaces. The cost of aircraft tires is thus very high, and due to the violent forces to which they are subjected when the aircraft contacts the ground they are very short lived.

SUMMARY OF THE INVENTION

By my invention I provide a novel method of rotating the wheels when they are moved to the aircraft landing position so that when they contact the ground in an aircraft landing operation the wheels are rotating at a speed approximating the ground speed of the aircraft. The tires are thus subjected to less violent forces. Better tires are thus possible since they are not subjected to such violent forces and tires having ground engaging treads can thus be made.

By shrouding the majority of the aircraft wheel to keep the air stream caused by movement of the aircraft through the air from contacting it and leaving exposed to the air stream only a portion of the wheel the force of the air passing over the exposed portion will exert a torque or turning force on the wheel which will quickly rotate the wheel preparatory to landing.

OBJECTS OF THE INVENTION

An object of my invention is to provide an aircraft wheel rotating device wherein the force exerted by the passage of the aircraft through the air rotates the wheel to the approximate ground speed of the aircraft so as to minimize stresses exerted on the tires and wheels when the aircraft lands.

A further object of my invention resides in the provision of fairing about the tires and wheels of aircraft wheels to shield more than approximately 50 percent of the tires and wheels from the air stream so that the force exerted on the exposed areas of the tires and wheels will rotate the wheels when the landing gear is moved to the landing position.

Another object is to provide an air stream operable device for rotating the wheels of aircraft preparatory to landing.

BRIEF DESCRIPTION OF THE DRAWINGS

My invention will be more fully understood with reference to the accompanying drawings of an illustrative model wherein.

DETAILED DESCRIPTION OF THE DRAWINGS

Figure 1:
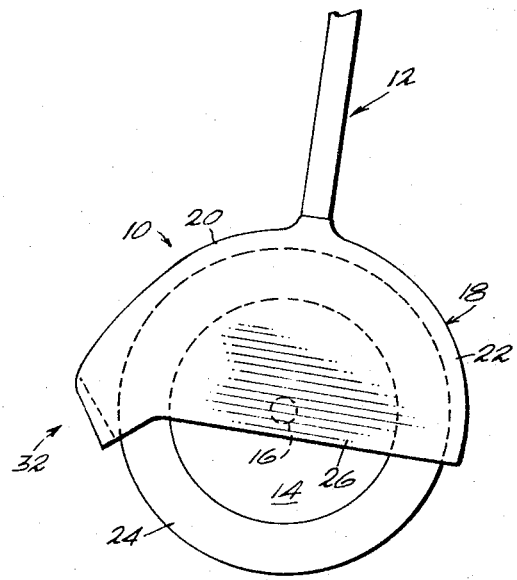
FIG. 1 is a side elevational view of a model wheel designed to illustrate my invention.

With reference to the drawings in which like reference characters designate like or corresponding parts throughout the several views and with particular reference to FIG. 1 the airplane wheel rotator of the present invention, designated generally at 10, is illustrated rotatably mounted on a retractable aircraft landing gear mechanism, illustrated diagrammatically at 12.

A conventional type of aircraft landing wheel 14 is illustrated, rotatably mounted on an axle 16, carried in a conventional manner by the landing gear mechanism 12. The wheel 10 is provided with an air deflecting fairing 18, contoured to lie adjacent to the side walls of the wheel 14. Curved, forwardly and rearwardly contoured sections 20 and 22 overlie the tire 24 to prevent the wind from the air stream from striking the portions of the wheel and tire which are covered by the fairing.

As will be observed in the drawings, the fairing 18 preferably covers somewhat more than the top half of the wheel and tire, having skirt portions 26, on both sides, extending below the axis of the wheel 14. As will be observed in FIG. 3, an inwardly turned section 28 from the bottom edge of each fairing skirt portion 26, provides an inner edge 30, contoured to conform generally with the contour of the side walls of the wheel 14 and tire 24 to further restrict the flow of air from the portions of the wheel and tire inside of the fairing 18.

Figure 2:
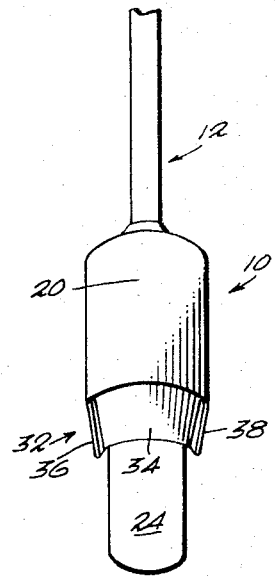
FIG. 2 is a front elevational view thereof.
Figure 3:
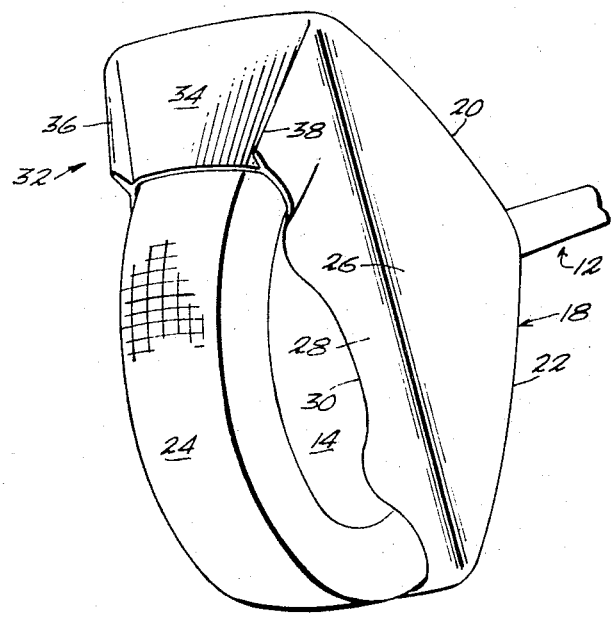
FIG. 3 is a bottom view to illustrate the fairing of the wheel and hub.

The bottom front portion of the forwardly contoured section 20 is provided with a downwardly, rearwardly directed shroud 32 extending below the longitudinal center-line area of the wheel to deflect a portion of the air stream flowing past the wheel to cause it to impinge on the tire 24 in a generally downwardly, rearwardly, path of travel. It will be noted that the shroud 32 includes a center web portion 34, spanning the width of the tire, which is bounded on opposite sides with upstanding flanges 36 and 38, preferably converging downwardly and rearwardly toward each other as best illustrated in FIGS. 2 and 3. In this manner the air stream passing along the web 34 between the flanges 36 and 38 is compressed, increasing its velocity as it flows downwardly to impinge on the bottom, front portion of the tire in a manner so as to exert a torque or turning force on the wheel which will quickly rotate said wheel preparatory to landing.

In practice, the fairing 18 would be constructed in a manner so as to permit its removal from the landing gear mechanism 12 to permit tire changes, etc., for example, it may be constructed in two half sections.

I claim:

1. An airplane wheel rotating device for the landing gear mechanism of an aircraft having a rotatable wheel and tire comprising, an air stream deflecting fairing in covering relation with respect to a major portion of the wheel and tire and exposing less than a 50 percent portion of the circumference of the tire and wheel to the air stream when the airplane landing gear is in landing position, the air stream deflecting fairing having a forward portion aligned vertically with the axis of the wheel, the upper and side portions of the air stream deflecting fairing rearwardly of the forward portion being contoured to deflect the air stream away from the wheel and tire, the lower portion of the air stream deflecting fairing rearwardly of the forward portion being contoured in front of the tire and wheel and extending downwardly at an angle to terminate substantially beneath the centerline through the forward portion of the fairing and the axis of the wheel and terminating closely adjacent to the tire to deflect the air stream downwardly from the forward portion of the fairing to induce the air stream to impinge on the tire in a downwardly and rearwardly direction to exert a rotative component of force on the central portion of the tire and wheel to rotate it in the direction of flight of the air craft when the wheel assembly is in the airplane landing position, the lower portion of the air stream deflecting fairing along the sides of the tire and wheel beneath the centerline through the forward portion of the fairing and the axle being contoured to terminate closely adjacent to the side walls of the tire and wheel to deflect the air stream away from the side walls of the tire and wheel whereby the air stream flowing over the exposed lower portions of the tire and wheel exerts a turning force on the tire and wheel to rotate it in the direction of the flight preparatory to the landing of the aircraft.

2. An airplane wheel rotator as defined in claim 1 wherein said fairing covers the major upper portion of said wheel and tire, exposing the minor lower portion thereof.

3. An airplane wheel rotator as defined in claim 1 wherein said lower fairing generally spans the width of the tire.

4. An airplane wheel rotator as defined in claim 3 wherein said lower fairing includes a main web portion spanning the width of the tire and opposed upstanding forward directed side flanges.

5. An airplane wheel rotator as defined in claim 4 wherein said side flanges converge downwardly and rearwardly.

* * * * *